United States Patent
Kimoto

(10) Patent No.: US 7,072,403 B2
(45) Date of Patent: Jul. 4, 2006

(54) DEVICE, METHOD AND RECORD MEDIUM FOR VIDEO DECODING CAPABLE OF CONDUCTING ERROR DETECTION PROCESS AND CONCEALMENT PROCESS EFFECTIVELY

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 605 days.

(21) Appl. No.: 09/741,065

(22) Filed: Dec. 21, 2000

(65) Prior Publication Data

US 2001/0005399 A1 Jun. 28, 2001

(30) Foreign Application Priority Data

Dec. 22, 1999 (JP) ............................................. 11-365623

(51) Int. Cl.
*H04N 7/12* (2006.01)

(52) U.S. Cl. ............................... 375/240.27; 375/240.25
(58) Field of Classification Search ............ 375/240.25, 375/240.26, 240.27; 348/425.1, 425.2; 382/252, 382/253, 309; 714/746, 747
See application file for complete search history.

(56) References Cited

U.S. PATENT DOCUMENTS

| | | | | |
|---|---|---|---|---|
| 5,442,400 A | * | 8/1995 | Sun et al. ............... | 375/240.15 |
| 5,550,847 A | * | 8/1996 | Zhu ............................. | 714/748 |
| 5,621,467 A | * | 4/1997 | Chien et al. ............. | 375/240.15 |
| 5,719,646 A | * | 2/1998 | Kikuchi et al. ......... | 375/240.27 |
| 5,724,369 A | * | 3/1998 | Brailean et al. ............. | 714/747 |
| 5,745,169 A | | 4/1998 | Murphy et al. ............. | 348/192 |
| 5,910,827 A | * | 6/1999 | Kwan et al. ............. | 375/240.27 |
| 5,933,567 A | * | 8/1999 | Lane et al. .................... | 386/68 |
| 6,040,879 A | * | 3/2000 | Park ........................ | 375/240.27 |
| 6,404,817 B1 | * | 6/2002 | Saha et al. ............. | 375/240.27 |
| 2002/0034256 A1 | * | 3/2002 | Talluri et al. ........... | 375/240.27 |

FOREIGN PATENT DOCUMENTS

JP 9-503890 4/1997

OTHER PUBLICATIONS

Tsekeridou et al., "An error concealment scheme for MPEG–2 coded video sequences", IEEE ISCAS'97, vol. 2, pp. 1289–1292, Jun. 1997.*

(Continued)

*Primary Examiner*—Vu Le
(74) *Attorney, Agent, or Firm*—Foley & Lardnerl LLP

(57) ABSTRACT

In a video decoding device for decoding a coded video signal which is supplied as packets each of which containing a plurality of coded block data units which have been generated by encoding blocks each of which is composed of a predetermined number of pixels of a frame of a video signal, an error detection section conducts error detection for each packet by use of error detection code which has been contained in the packet. A packet partitioning section partitions the packet into the coded block data units, while outputting an address signal indicating addresses of blocks that have been contained in the packets to which the errors have occurred. A video decoding section successively decodes the coded block data units. A first invalid block judgment section conducts an invalid block judgment process only for blocks that are designated by the address signal. A first invalid block concealment section conducts a concealment process (pixel value correction) for blocks that have been judged by the first invalid block judgment section as invalid blocks. By such composition and operation of the video decoding device, the load on the first invalid block judgment section can be reduced much, thereby the invalid block judgment process and the concealment process can be executed efficiently and effectively.

63 Claims, 7 Drawing Sheets

OTHER PUBLICATIONS

Keck, W., "A method for robust decoding of erroneous MPEG–2 video bitstreams", IEEE Transactions on Consumer Electronic vol. 42, Iss. 3, pp. 411–421, Aug. 1996.*

Wada, M., "Selective recovery of video packet loss using error concealment", IEEE Journal on Selected Areas in Communications, vol. 7, Iss. 5, pp. 807–814, Jun. 1989.*

P. Salama et al., "A Bayesian Approach to Error Concealment in Encoded Video Streams", International Conference of Image Processing, pp. 49–52, 1996.

Yoshimi Isu et al., "A Study on Error Detection for Video Decoding based on the Continuity of Image Signal", Picture Coding Symposium of Japan, pp. 47–48, 1998.

* cited by examiner

F I G. 4

|  | R00 | R10 | R20 | R30 | R40 | R50 | R60 | R70 |  |
|---|---|---|---|---|---|---|---|---|---|
| T77 | C07 | C17 | C27 | C37 | C47 | C57 | C67 | C77 | B07 |
| T76 | C06 | C16 | C26 | C36 | C46 | C56 | C66 | C76 | B06 |
| T75 | C05 | C15 | C25 | C35 | C45 | C55 | C65 | C75 | B05 |
| T74 | C04 | C14 | C24 | C34 | C44 | C54 | C64 | C74 | B04 |
| T73 | C03 | C13 | C23 | C33 | C43 | C53 | C63 | C73 | B03 |
| T72 | C02 | C12 | C22 | C32 | C42 | C52 | C62 | C72 | B02 |
| T71 | C01 | C11 | C21 | C31 | C41 | C51 | C61 | C71 | B01 |
| T70 | C00 | C10 | C20 | C30 | C40 | C50 | C60 | C70 | B00 |
|  | L07 | L17 | L27 | L37 | L47 | L57 | L67 | L77 |  |

DEVICE, METHOD AND RECORD MEDIUM FOR VIDEO DECODING CAPABLE OF CONDUCTING ERROR DETECTION PROCESS AND CONCEALMENT PROCESS EFFECTIVELY

BACKGROUND OF THE INVENTION

The present invention relates to a video decoding device and a video decoding method for decoding a coded video signal, and in particular, to a video decoding device and a video decoding method capable of reducing the deterioration of video data even when the coded video signal have been transferred through a communication line of low line quality.

Description of the Related Art

When a coded video signal is transferred through a transmission line of low line quality, the quality of a video signal which is obtained by decoding the coded video signal becomes lower than the original video signal due to errors occurring in the signal transfer.

For the elimination of the video signal deterioration, an error detection process (for detecting and determining points in the video signal to which errors have occurred) and a concealment process (for correcting pixel values at the error points and thereby concealing the errors) become necessary.

As methods for the error detection process, two methods are widely known. In a first error detection method, the error is detected based on the video decoding status or based on the decoded video data. In a second error detection method, error detection code (code for the error detection) is preliminarily included in the coded video signal to be transferred, and the error detection is executed by a device at the receiving end by use of the error detection code.

FIG. 1 is a block diagram showing a conventional video decoding device which executes the video decoding employing the first error detection method. Referring to FIG. 1, the video decoding device includes a packet partitioning section 201, a video decoding section 202, an invalid block judgment section 203 and a first invalid block concealment section 204. The video decoding section 202 includes a block data decoding section 205, a frame memory 206 and a second invalid block concealment section 207.

The packet partitioning section 201 of the video decoding device receives a coded video signal (input signal) 2000. The coded video signal 2000 is transferred to the packet partitioning section 201 in the form of a packet (TCP (Transmission Control Protocol) packet, UDP (User Datagram Protocol) packet, ATM (Asynchronous Transfer Mode) cell, etc.) containing a plurality of (10, for example) coded block data (coded block data units). Each of the coded block data units has been generated by a video encoding device by encoding a pixel block (i.e. an encoding unit of the video signal) of a frame (frame image). The packet partitioning section 201 which received the coded video signal 2000 (packet) partitions the packet into a plurality of coded block data units 2001 and sends the coded block data units 2001 to the block data decoding section 205 of the video decoding section 202.

The block data decoding section 205 which received the coded block data units 2001 decodes the coded block data units 2001 and stores the result of decoding (block data (block data units) 2002) in the frame memory 206.

When the video decoding for a block is impossible due to errors or when a coded block data unit 2001 for a block can not be obtained since a packet containing the coded block data unit 2001 does not reach, the second invalid block concealment section 207 obtains an appropriate (decoded) block data unit of a previous frame (previous block data unit 2005) which has been stored in the frame memory 206 and uses the obtained block data unit as a corrected block data unit.

The invalid block judgment section 203 judges whether or not each block (block data unit) of a frame (frame image) which has been stored in the frame memory 206 is an invalid block which has been decoded erroneously, and sends the judgment result 2008 to the first invalid block concealment section 204.

The first invalid block concealment section 204 calculates block data for the block (that has been judged by the invalid block judgment section 203 as an invalid block) based on block data units of blocks around the invalid block or based on a block data unit of an appropriate block in the previous frame, and sends the calculated block data unit 2010 to the frame memory 206.

By the above operation, decoded video data 2011, which has been obtained by the decoding process of the block data decoding section 205 and the concealment processes of the first invalid block concealment section 204 and the second invalid block concealment section 207, is outputted from the video decoding section 202.

FIG. 2 is a block diagram showing a conventional video decoding device which executes video decoding employing the second error detection method. Referring to FIG. 2, the video decoding device includes an error detection section 301, a packet partitioning section 302, a video decoding section 303 and an invalid block concealment section 304. The video decoding section 303 includes a block data decoding section 305 and a frame memory 306.

The coded video signal (input signal) 3000 which is supplied to the error detection section 301 in the form of a packet includes error detection code such as CRC (Cyclic Redundancy Check). The error detection section 301 judges whether an error has occurred to each packet or not by use of the error detection code contained in the packet, and sends a judgment signal 3002 (indicating the result of the judgment) and the packet 3001 (from which the error detection code has been removed) to the packet partitioning section 302.

The packet partitioning section 302 partitions the packet 3001 into blocks (coded block data units 3003). With regard to a packet to which the error has occurred, the packet partitioning section 302 informs the invalid block concealment section 304 about addresses of blocks corresponding to the packet by sending an address signal 3004 to the invalid block concealment section 304.

The block data decoding section 305 of the video decoding section 303 conducts decoding with regard to coded block data units 3003 that are normal, and stores the decoded block data units (block data units 3005) in the frame memory 306.

The invalid block concealment section 304 refers to the invalid block addresses 3004 supplied from the packet partitioning section 302, and calculates corrected values for each invalid block (that is, a block to which an error might have occurred) based on block data units of blocks around the invalid block or based on a block data unit of an appropriate block in the previous frame, and sends the calculated block data unit 3008 to the frame memory 306.

By the above operation, decoded video data 3009, which has been obtained by the decoding process of the block data decoding section 305 and the concealment processes of the invalid block concealment section 304, is outputted from the video decoding section 303.

However, in the conventional video decoding device of FIG. 1 which executes the video decoding employing the first error detection method, the invalid block judgment section 203 has to conduct the judgment for all the decoded blocks solely, therefore, erroneous judgment can occur in the judgment process with regard to blocks which have been decoded normally. Concretely, the invalid block judgment section 203 conducts the judgment by comparing pixel values on the edge of the block with pixel values of adjacent blocks, therefore, the judgment might be made erroneously when an outline (where the pixel value changes steeply) overlapped the edge of the block. Therefore, in the case of the conventional video decoding device of FIG. 1, misjudgment tends to occur in the judgment which is solely conducted by the invalid block judgment section 203 by use of the pixel values. Further, the load on the invalid block judgment section 203, which is required enormous throughput, is necessitated to be very heavy.

In the conventional video decoding device of FIG. 2 which executes the video decoding employing the second error detection method, the concealment process is conducted to all the blocks contained in the packet to which an error has been occurred. Therefore, as the length of the packet is made longer, the possibility of wasteful concealment processes for normal blocks increases. On the other hand, if the length of the packet is made shorter, the ratio of the error detection code in the packet increases and thereby the coding efficiency is necessitated to be low.

SUMMARY OF THE INVENTION

It is therefore the primary object of the present invention to provide an image decoding device and an image decoding method, by which the detection of error points of the video signal and the concealment process can be conducted effectively and efficiently and thereby the deterioration of the video signal can be prevented even when the coded video signal is transferred through a transmission line of low line quality.

In accordance with a first aspect of the present invention, there is provided a video decoding device for decoding a coded video signal which is supplied to the video decoding device as packets each of which containing a plurality of coded block data units which have been generated by encoding blocks each of which is composed of a predetermined number of pixels of a frame of a video signal. The video decoding device comprises an error detection means, a packet partitioning means, a video decoding means, a first invalid block judgment means and a first invalid block concealment means. The error detection means judges whether or not an error has occurred to each of the packets and outputs a judgment signal indicating the result of the judgment. The packet partitioning means partitions the packet after the error detection by the error detection means into the coded block data units, while outputting an address signal indicating addresses of blocks that have been contained in the packets to which the errors have occurred. The video decoding means successively decodes the coded block data units and outputs a decoded video signal containing block data units obtained by the decoding of the coded block data units. The first invalid block judgment means judges whether or not each of the block data units corresponding to the addresses indicated by the address signal from the packet partitioning means is an invalid block which has been decoded abnormally, based on pixel values of adjacent blocks. The first invalid block concealment means conducts a concealment process with regard to the block data units that have been judged by the first invalid block judgment means as invalid blocks.

In accordance with a second aspect of the present invention, in the first aspect, the error detection means conducts the judgment for each packet by use of error detection code which has been contained in the packet.

In accordance with a third aspect of the present invention, in the first aspect, the first invalid block judgment means includes a judgment value calculation means, a first comparison means, a flag storage means and a second comparison means. The judgment value calculation means calculates a judgment value concerning pixel value variation with regard to each pixel in the block designated by the address signal from the packet partitioning means, by referring to pixel values of the designated block and/or pixel values of adjacent blocks. The first comparison means successively compares the judgment value with regard to each pixel calculated by the judgment value calculation means with a first threshold value and successively outputs a comparison result signal with regard to each pixel. The flag storage means stores a flag which is incremented depending on the comparison result signal with regard to each pixel. The second comparison means compares the value of the flag with a second threshold value.

In accordance with a fourth aspect of the present invention, in the first aspect, the first invalid block concealment means conducts the concealment process by means of an intra-frame concealment process in which pixel values of the block data unit is corrected by use of pixel values of adjacent blocks in the current frame.

In accordance with a fifth aspect of the present invention, in the first aspect, the first invalid block concealment means conducts the concealment process by means of an inter-frame concealment process in which pixel values of the block data unit is corrected by use of pixel values of an appropriate block data unit of the previous frame.

In accordance with a sixth aspect of the present invention, in the first aspect, the video decoding device is applied to cases where the packets are TCP (Transmission Control Protocol) packets, UDP (User Datagram Protocol) packets or ATM (Asynchronous Transfer Mode) cells.

In accordance with a seventh aspect of the present invention, in the first aspect, the video decoding means includes a frame memory means, a block data decoding means and a second invalid block concealment means. The frame memory means stores the block data units of previously decoded frames and the block data units of a currently decoded frame. The block data decoding means successively decodes the coded block data units and outputs the block data units obtained by the decoding of the coded block data units, while outputting an address signal indicating addresses of blocks which could not be decoded normally due to errors contained in the coded block data. The second invalid block concealment means conducts a concealment process with regard to the block data units corresponding to the addresses indicated by the address signal from the block data decoding means.

In accordance with an eighth aspect of the present invention, in the seventh aspect, the block data decoding means conducts the decoding of the coded block data units by use of block data units of the previous frame which have been stored in the frame memory means.

In accordance with a ninth aspect of the present invention, in the seventh aspect, the second invalid block concealment means conducts the concealment process by means of the intra-frame concealment process.

In accordance with a tenth aspect of the present invention, in the seventh aspect, the second invalid block concealment means conducts the concealment process by means of the inter-frame concealment process.

In accordance with an eleventh aspect of the present invention, in the first aspect, the video decoding means includes a frame memory means, a block data decoding means, a second invalid block concealment means, a second invalid block judgment means and a third invalid block concealment means. The frame memory means stores the block data units of previously decoded frames and the block data units of a currently decoded frame. The block data decoding means successively decodes the coded block data units and outputs the block data units obtained by the decoding of the coded block data units, while outputting an address signal indicating addresses of blocks which could not be decoded normally due to errors contained in the coded block data. The second invalid block concealment means conducts a concealment process with regard to the block data units corresponding to the addresses indicated by the address signal from the block data decoding means. The second invalid block judgment means judges whether or not each block data unit obtained by the concealment process of the second invalid block concealment means is an invalid block whose pixel values are inadequate, based on pixel values of adjacent blocks. The third invalid block concealment means conducts a concealment process with regard to the block data units which have been judged by the second invalid block judgment means as invalid blocks.

In accordance with a twelfth aspect of the present invention, in the eleventh aspect, the block data decoding means conducts the decoding of the coded block data units by use of block data units of the previous frame which have been stored in the frame memory means.

In accordance with a thirteenth aspect of the present invention, in the eleventh aspect, the second invalid block judgment means includes a judgment value calculation means, a first comparison means, a flag storage means and a second comparison means. The judgment value calculation means calculates a judgment value concerning pixel value variation with regard to each pixel in the block designated by the address signal from the packet partitioning means, by referring to pixel values of the designated block and/or pixel values of adjacent blocks. The first comparison means successively compares the judgment value with regard to each pixel calculated by the judgment value calculation means with a first threshold value and successively outputs a comparison result signal with regard to each pixel. The flag storage means stores a flag which is incremented depending on the comparison result signal with regard to each pixel. The second comparison means compares the value of the flag with a second threshold value.

In accordance with a fourteenth aspect of the present invention, in the eleventh aspect, the second invalid block concealment means conducts the concealment process by means of the inter-frame concealment process, and the third invalid block concealment means conducts the concealment process by means of the intra-frame concealment process.

In accordance with a fifteenth aspect of the present invention, there is provided a video decoding device for decoding a coded video signal which is supplied to the video decoding device as packets each of which containing a plurality of coded block data units which have been generated by encoding blocks each of which is composed of a predetermined number of pixels of a frame of a video signal. The video decoding device comprises an error detection means, a packet partitioning means and a video decoding means. The error detection means judges whether or not an error has occurred to each of the packets and outputs a judgment signal indicating the result of the judgment. The packet partitioning means partitions the packet after the error detection by the error detection means into the coded block data units, while outputting an address signal indicating addresses of blocks that have been contained in the packets to which the errors have occurred. The video decoding means successively decodes the coded block data units and outputs a decoded video signal containing block data units obtained by the decoding of the coded block data units. The video decoding means includes a frame memory means, a block data decoding means, a second invalid block concealment means, a second invalid block judgment means and a third invalid block concealment means. The a frame memory means stores the block data units of previously decoded frames and the block data units of a currently decoded frame. The block data decoding means successively decodes the coded block data units and outputs the block data units obtained by the decoding of the coded block data units, while outputting an address signal indicating addresses of blocks which could not be decoded normally due to errors contained in the coded block data. The second invalid block concealment means conducts a concealment process with regard to the block data units corresponding to the addresses indicated by the address signal from the block data decoding means. The second invalid block judgment means judges whether or not each block data unit obtained by the concealment process of the second invalid block concealment means is an invalid block whose pixel values are inadequate, based on pixel values of adjacent blocks. The third invalid block concealment means conducts a concealment process with regard to the block data units which have been judged by the second invalid block judgment means as invalid blocks.

In accordance with a sixteenth aspect of the present invention, in the fifteenth aspect, the error detection means conducts the judgment for each packet by use of error detection code which has been contained in the packet.

In accordance with a seventeenth aspect of the present invention, in the fifteenth aspect, the block data decoding means conducts the decoding of the coded block data units by use of block data units of the previous frame which have been stored in the frame memory means.

In accordance with an eighteenth aspect of the present invention, in the fifteenth aspect, the second invalid block judgment means includes a judgment value calculation means, a first comparison means, a flag storage means and a second comparison means. The judgment value calculation means calculates a judgment value concerning pixel value variation with regard to each pixel in the block designated by the address signal from the packet partitioning means, by referring to pixel values of the designated block and/or pixel values of adjacent blocks. The first comparison means successively compares the judgment value with regard to each pixel calculated by the judgment value calculation means with a first threshold value and successively outputs a comparison result signal with regard to each pixel. The flag storage means stores a flag which is incremented depending on the comparison result signal with regard to each pixel. The second comparison means compares the value of the flag with a second threshold value.

In accordance with a nineteenth aspect of the present invention, in the fifteenth aspect, the second invalid block concealment means conducts the concealment process by means of the inter-frame concealment process, and the third invalid block concealment means conducts the concealment process by means of the intra-frame concealment process.

In accordance with a twentieth aspect of the present invention, in the fifteenth aspect, the video decoding device is applied to cases where the packets are TCP packets, UDP packets or ATM cells.

In accordance with a twenty-first aspect of the present invention, there is provided a video decoding method for decoding a coded video signal which is supplied as packets each of which containing a plurality of coded block data units which have been generated by encoding blocks each of which is composed of a predetermined number of pixels of a frame of a video signal. The video decoding method comprises an error detection step, a packet partitioning step, a video decoding step, a first invalid block judgment step and a first invalid block concealment step. In the error detection step, whether or not an error has occurred to each of the packets is judged and a judgment signal indicating the result of the judgment is generated. In the packet partitioning step, the packet after the error detection of the error detection step is partitioned into the coded block data units, while an address signal, indicating addresses of blocks that have been contained in the packets to which the errors have occurred, is generated. In the video decoding step, the coded block data units are successively decoded in order to generate a decoded video signal containing block data units obtained by the decoding of the coded block data units. In the first invalid block judgment step, it is judged whether or not each of the block data units corresponding to the addresses indicated by the address signal generated in the packet partitioning step is an invalid block which has been decoded abnormally, based on pixel values of adjacent blocks. In the first invalid block concealment step, a concealment process is conducted for the block data units that have been judged in the first invalid block judgment step as invalid blocks.

In accordance with a twenty-second aspect of the present invention, in the twenty-first aspect, in the error detection step, the judgment for each packet is conducted by use of error detection code which has been contained in the packet.

In accordance with a twenty-third aspect of the present invention, in the twenty-first aspect, the first invalid block judgment step includes a judgment value calculation step, a first comparison step, a flag increment step and a second comparison step. In the judgment value calculation step, a judgment value concerning pixel value variation is calculated with regard to each pixel in the block designated by the address signal generated in the packet partitioning step, by referring to pixel values of the designated block and/or pixel values of adjacent blocks. In the first comparison step, the judgment value with regard to each pixel calculated in the judgment value calculation step is successively compared with a first threshold value, and a comparison result signal with regard to each pixel is successively generated. In the flag increment step, a flag which is stored in a flag storage means is successively incremented depending on the comparison result signal with regard to each pixel. In the second comparison step, the value of the flag is compared with a second threshold value.

In accordance with a twenty-fourth aspect of the present invention, in the twenty-first aspect, in the first invalid block concealment step, the concealment process is conducted by means of the intra-frame concealment process.

In accordance with a twenty-fifth aspect of the present invention, in the twenty-first aspect, in the first invalid block concealment step, the concealment process is conducted by means of the inter-frame concealment process.

In accordance with a twenty-sixth aspect of the present invention, in the twenty-first aspect, the video decoding method is applied to cases where the packets are TCP packets, UDP packets or ATM cells.

In accordance with a twenty-seventh aspect of the present invention, in the twenty-first aspect, the video decoding step includes a frame memory storage step, a block data decoding step and a second invalid block concealment step. In the frame memory storage step, the block data units of previously decoded frames and the block data units of a currently decoded frame are stored in a frame memory means. In the block data decoding step, the coded block data units are successively decoded and thereby the block data units as the result of the decoding are obtained, while an address signal, indicating addresses of blocks which could not be decoded normally due to errors contained in the coded block data, is generated. In the second invalid block concealment step, a concealment process is conducted for the block data units corresponding to the addresses indicated by the address signal generated in the block data decoding step.

In accordance with a twenty-eighth aspect of the present invention, in the twenty-seventh aspect, in the block data decoding step, the decoding of the coded block data units is conducted by use of block data units of the previous frame which have been stored in the frame memory means.

In accordance with a twenty-ninth aspect of the present invention, in the twenty-seventh aspect, in the second invalid block concealment step, the concealment process is conducted by means of the intra-frame concealment process.

In accordance with a thirtieth aspect of the present invention, in the twenty-seventh aspect, in the second invalid block concealment step, the concealment process is conducted by means of the inter-frame concealment process.

In accordance with a thirty-first aspect of the present invention, in the twenty-first aspect, the video decoding step includes a frame memory storage step, a block data decoding step, a second invalid block concealment step, a second invalid block judgment step and a third invalid block concealment step. In the frame memory storage step, the block data units of previously decoded frames and the block data units of a currently decoded frame are stored in a frame memory means. In the block data decoding step, the coded block data units are successively decoded and thereby the block data units as the result of the decoding are obtained, while an address signal, indicating addresses of blocks which could not be decoded normally due to errors contained in the coded block data, is generated. In the second invalid block concealment step, a concealment process is conducted for the block data units corresponding to the addresses indicated by the address signal generated in the block data decoding step. In the second invalid block judgment step, it is judged whether or not each block data unit obtained by the concealment process in the second invalid block concealment step is an invalid block whose pixel values are inadequate, based on pixel values of adjacent blocks. In the third invalid block concealment step, a concealment process is conducted for the block data units which have been judged in the second invalid block judgment step as invalid blocks.

In accordance with a thirty-second aspect of the present invention, in the thirty-first aspect, in the block data decoding step, the decoding of the coded block data units is conducted by use of block data units of the previous frame which have been stored in the frame memory means.

In accordance with a thirty-third aspect of the present invention, in the thirty-first aspect, the second invalid block judgment step includes a judgment value calculation step, a first comparison step, a flag increment step and a second comparison step. In the judgment value calculation step, a judgment value concerning pixel value variation is calculated with regard to each pixel in the block designated by the address signal generated in the packet partitioning step, by referring to pixel values of the designated block and/or pixel values of adjacent blocks. In the first comparison step, the judgment value with regard to each pixel calculated in the judgment value calculation step is successively compared with a first threshold value, and a comparison result signal with regard to each pixel is successively generated. In the flag increment step, a flag which is stored in a flag storage means is successively incremented depending on the comparison result signal with regard to each pixel. In the second comparison step, the value of the flag is compared with a second threshold value.

In accordance with a thirty-fourth aspect of the present invention, in the thirty-first aspect, the concealment process in the second invalid block concealment step is conducted by means of the inter-frame concealment process, and the concealment process in the third invalid block concealment step is conducted by means of the intra-frame concealment process.

In accordance with a thirty-fifth aspect of the present invention, there is provided a video decoding method for decoding a coded video signal which is supplied as packets each of which containing a plurality of coded block data units which have been generated by encoding blocks each of which is composed of a predetermined number of pixels of a frame of a video signal. The video decoding method comprises an error detection step, a packet partitioning step and a video decoding step. In the error detection step, whether or not an error has occurred to each of the packets is judged and a judgment signal indicating the result of the judgment is generated. In the packet partitioning step, the packet after the error detection of the error detection step is partitioned into the coded block data units, while an address signal, indicating addresses of blocks that have been contained in the packets to which the errors have occurred, is generated. In the video decoding step, the coded block data units are successively decoded in order to generate a decoded video signal containing block data units obtained by the decoding of the coded block data units. The video decoding step includes a frame memory storage step, a block data decoding step, a second invalid block concealment step, a second invalid block judgment step and a third invalid block concealment step. In the frame memory storage step, the block data units of previously decoded frames and the block data units of a currently decoded frame are stored in a frame memory means. In the block data decoding step, the coded block data units are successively decoded and thereby the block data units as the result of the decoding are obtained, while an address signal, indicating addresses of blocks which could not be decoded normally due to errors contained in the coded block data, is generated. In the second invalid block concealment step, a concealment process is conducted for the block data units corresponding to the addresses indicated by the address signal generated in the block data decoding step. In the second invalid block judgment step, it is judged whether or not each block data unit obtained by the concealment process in the second invalid block concealment step is an invalid block whose pixel values are inadequate, based on pixel values of adjacent blocks. In the third invalid block concealment step, a concealment process is conducted for the block data units which have been judged in the second invalid block judgment step as invalid blocks.

In accordance with a thirty-sixth aspect of the present invention, in the thirty-fifth aspect, in the error detection step, the judgment for each packet is conducted by use of error detection code which has been contained in the packet.

In accordance with a thirty-seventh aspect of the present invention, in the thirty-fifth aspect, in the block data decoding step, the decoding of the coded block data units is conducted by use of block data units of the previous frame which have been stored in the frame memory means.

In accordance with a thirty-eighth aspect of the present invention, in the thirty-fifth aspect, the second invalid block judgment step includes a judgment value calculation step, a first comparison step, a flag increment step and a second comparison step. In the judgment value calculation step, a judgment value concerning pixel value variation is calculated with regard to each pixel in the block designated by the address signal generated in the packet partitioning step, by referring to pixel values of the designated block and/or pixel values of adjacent blocks. In the first comparison step, the judgment value with regard to each pixel calculated in the judgment value calculation step is successively compared with a first threshold value, and a comparison result signal with regard to each pixel is successively generated. In the flag increment step, a flag which is stored in a flag storage means is successively incremented depending on the comparison result signal with regard to each pixel. In the second comparison step, the value of the flag is compared with a second threshold value.

In accordance with a thirty-ninth aspect of the present invention, in the thirty-fifth aspect, the concealment process in the second invalid block concealment step is conducted by means of the inter-frame concealment process, and the concealment process in the third invalid block concealment step is conducted by means of the intra-frame concealment process.

In accordance with a fortieth aspect of the present invention, in the thirty-fifth aspect, the video decoding method is applied to cases where the packets are TCP packets, UDP packets or ATM cells.

In accordance with forty-first through sixtieth aspects of the present invention, there are provided machine-readable record mediums storing programs for instructing an MPU (MicroProcessor Unit) etc. to execute the video decoding methods of the twenty-first through fortieth aspects of the present invention.

BRIEF DESCRIPTION OF THE DRAWINGS

The objects and features of the present invention will become more apparent from the consideration of the following detailed description taken in conjunction with the accompanying drawings, in which:

FIG. 4 is a schematic diagram showing pixels of a block as an object of a concealment process and pixels around the block;

DESCRIPTION OF THE PREFERRED EMBODIMENTS

Figure 1:
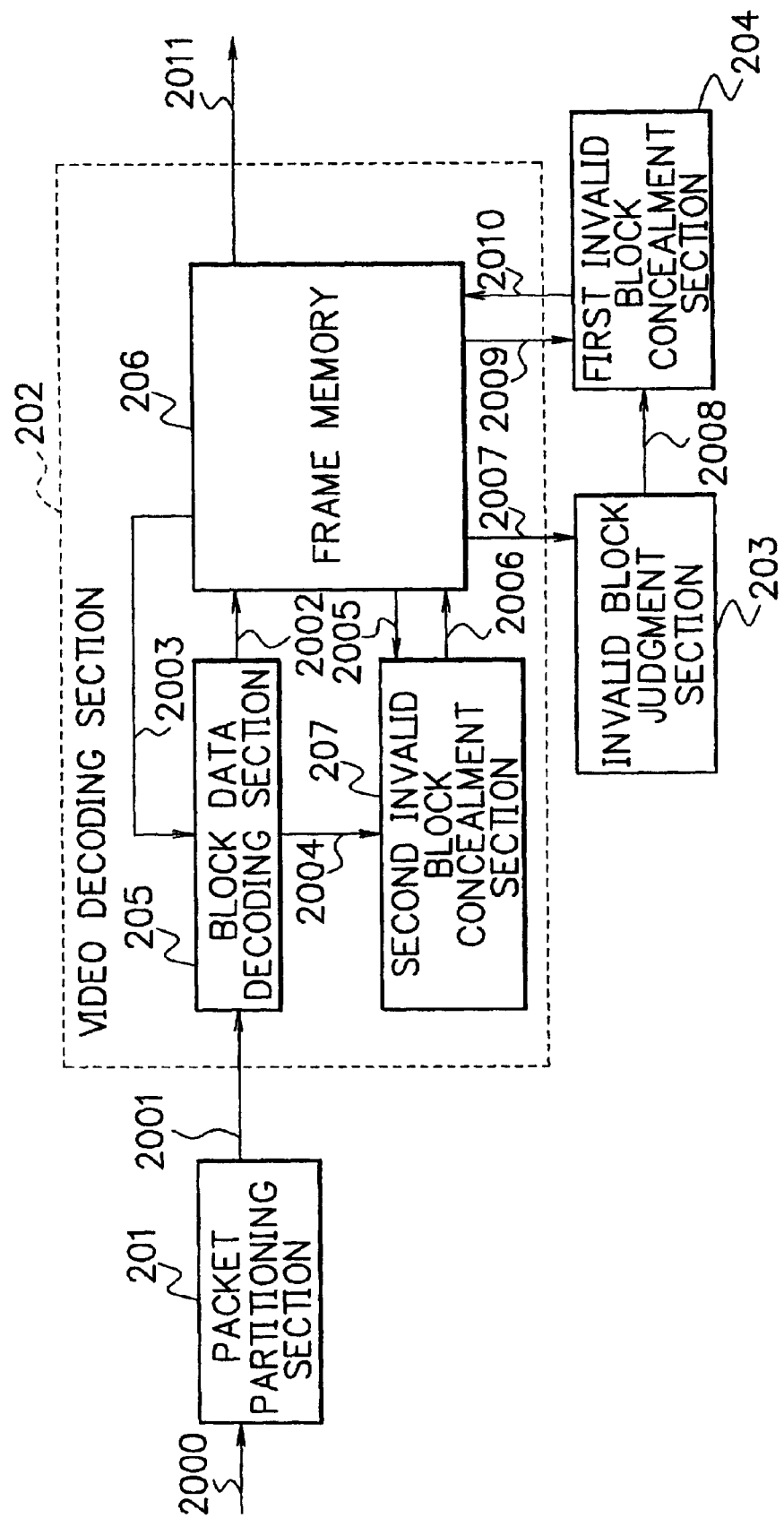
FIG. 1 is a block diagram showing a first conventional video decoding device which executes video decoding employing a first error detection method, in which error detection is conducted based on video decoding status or based on decoded video data.

Referring now to the drawings, a description will be given in detail of preferred embodiments in accordance with the present invention.

Figure 3:
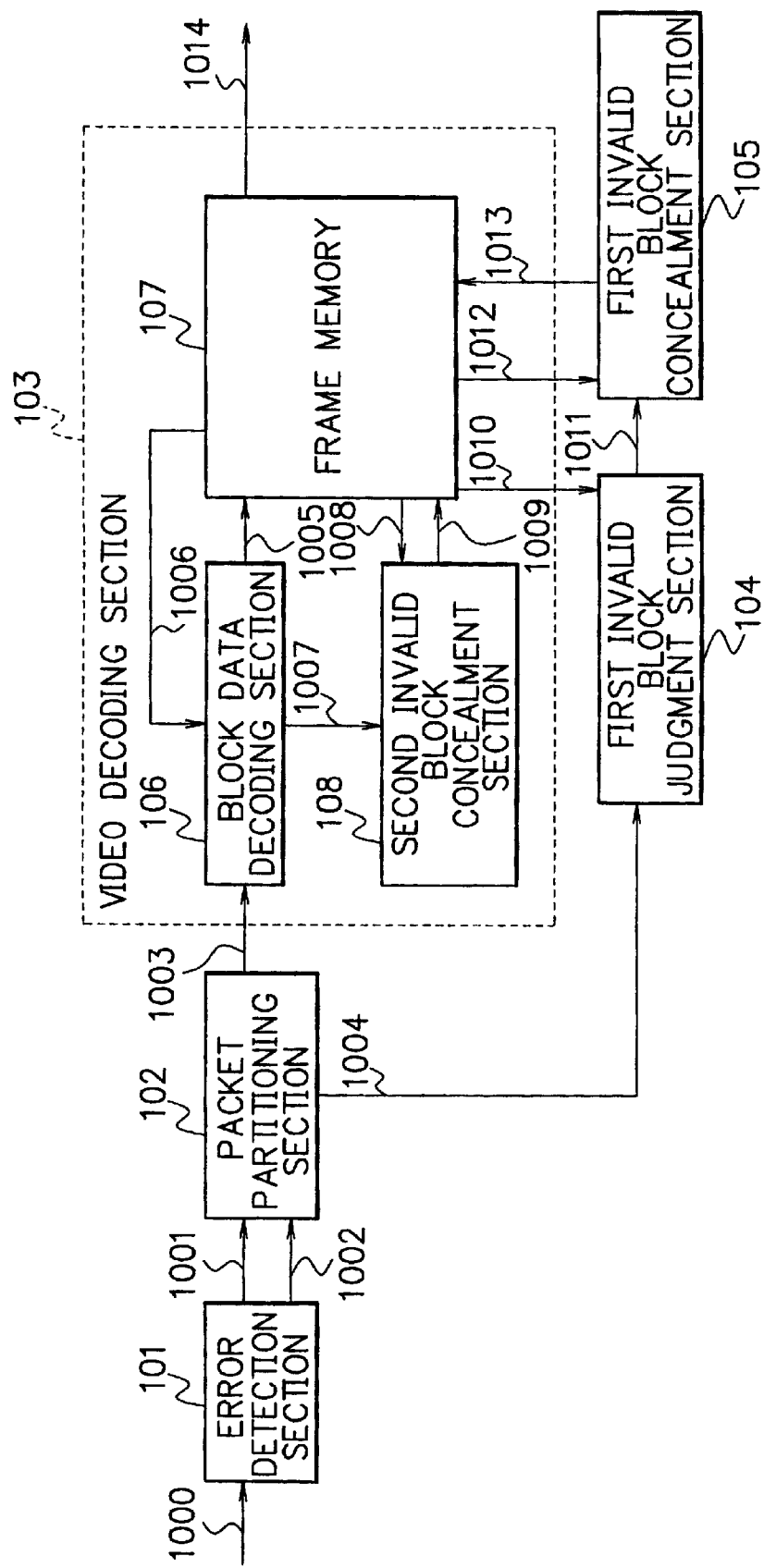
FIG. 3 is a block diagram showing a video decoding device in accordance with a first embodiment of the present invention.

FIG. 3 is a block diagram showing a video decoding device in accordance with a first embodiment of the present invention.

Referring to FIG. 3, the video decoding device of the first embodiment includes an error detection section 101, a packet partitioning section 102, a video decoding section 103, a first invalid block judgment section 104 and a first invalid block concealment section 105. The video decoding section 103 includes a block data decoding section 106, a frame memory 107 and a second invalid block concealment section 108.

The above components of the video decoding device can be implemented by, for example, a microprocessor unit which is composed of a CPU (Central Processing Unit), ROM (Read Only Memory), RAM (Random Access Memory), etc., and appropriate software. Such software for realizing the operation of the video decoding device is stored in one or more record mediums.

The error detection section 101 of the video decoding device receives a coded video signal (input signal) 1000. The coded video signal 1000 is transferred to the error detection section 101 in the form of a packet (TCP (Transmission Control Protocol) packet, UDP (User Datagram Protocol) packet, ATM (Asynchronous Transfer Mode) cell, etc.) containing a plurality of (10, for example) coded block data units. Each coded block data unit has been generated by a video encoding device by encoding (compressing) a pixel block (an encoding unit of the video signal) of a frame according to MPEG1, MPEG2, MPEG4, H.261, H.263, etc. The coded video signal 1000 (packet) supplied to the error detection section 101 includes error detection code such as CRC (Cyclic Redundancy Check). The error detection section 101 judges whether or not an error has occurred to each packet by use of the error detection code contained in the packet, and sends a judgment signal 1002 (indicating the result of the judgment) and the packet 1001 (from which the error detection code has been removed) to the packet partitioning section 102.

The packet partitioning section 102 partitions the packet 1001 supplied from the error detection section 101 into blocks (coded block data units 1003) and thereby outputs the coded block data units 1003 to the video decoding section 103, while referring to the judgment signal 1002 and thereby sending address signals 1004 (indicating addresses of blocks to which errors might have occurred (that is, addresses of blocks contained in the packets in which errors have been detected by the error detection section 101)) to the first invalid block judgment section 104.

The video decoding section 103 receives the coded block data units 1003 from the packet partitioning section 102 and generates and outputs decoded video data 1014 as will be explained below, while storing decoded video data with regard to one or a few previous frames in the frame memory 107.

The first invalid block judgment section 104 judges whether or not each block (block data unit) that has been stored in the frame memory 107 of the video decoding section 103 and that is designated by the address signal 1004 is an invalid block (that is, a block to which an error has occurred), and sends a judgment signal 1011 indicating the result of the judgment to the first invalid block concealment section 105. Methods which can be employed by the first invalid block judgment section 104 for the judgment will be explained later.

The first invalid block concealment section 105 conducts a concealment process with regard to the blocks that have been stored in the frame memory 107 and that have been designated as invalid blocks by the judgment signal 1011 supplied from the first invalid block judgment section 104. The concealment process of the first invalid block concealment section 105 is conducted by means of an intra-frame concealment process (using adjacent blocks in the current frame) or an inter-frame concealment process (using block data units of the previous frame). Block data units 1013 obtained by the concealment process of the first invalid block concealment section 105 are stored in the frame memory 107.

In the video decoding section 103, the block data decoding section 106 receives the coded block data unit 1003 from the packet partitioning section 102, decodes the coded block data unit 1003 by use of previous decoded block data units 1006 (decoded block data units of the previous frame) stored in the frame memory 107, and stores the decoded block data units 1005 in the frame memory 107. Incidentally, while the block data decoding section 106 of this embodiment employs a video decoding mode in which the previous decoded block data units 1006 are used for the decoding of the coded block data units 1003 (as is usual in MPEG etc.), it is also possible to let the block data decoding section 106 employ a video decoding mode in which the previous decoded block data units 1006 are not used for the decoding.

In the frame memory 107, the (decoded) block data units 1005 of the current frame which are currently supplied from the block data decoding section 106 and (decoded) block data units of previous frames (a few frames) are stored. The frame memory 107 also stores block data units 1013 and 1009 which are obtained by the concealment processes of the first invalid block concealment section 105 and the second invalid block concealment section 108.

The second invalid block concealment section 108 receives an address signal 1007 (indicating addresses of invalid blocks) from the block data decoding section 106, and conducts concealment processes with regard to the blocks that have been stored in the frame memory 107 and that have been designated as invalid blocks by the address signal 1007 supplied from the block data decoding section 106. Incidentally, the block data decoding section 106 judges that a block is an invalid block when the coded block data unit of the block is irregular data and the coded block data unit can not be decoded normally. The concealment process of the second invalid block concealment section 108 is also conducted by means of an intra-frame concealment process (using adjacent blocks in the current frame) or an inter-frame concealment process (using block data units of the previous frame). Block data units 1009 obtained by the concealment process of the second invalid block concealment section 108 are stored in the frame memory 107.

In the following, the intra-frame concealment process and the inter-frame concealment process which can be employed by the first invalid block concealment section 105 and the second invalid block concealment section 108 will be explained in detail.

First, the intra-frame concealment process will be explained referring to FIG. 4. FIG. 4 is a schematic diagram showing pixels (C00~C77) of a block as an object of the concealment process and pixels (T70~T77, B00~L07, L07~L77, R00~R70) around the block. In the intra-frame concealment process, pixel values of the pixels (C00~C77) of the 8×8 object block are estimated and determined by use of pixel values of the surrounding pixels (T70~T77, B00~B07, L07~L77, R00~R70) as will be explained below, for example.

If both the block on the left-hand side of the object block (left-hand side block) and the block on the right-hand side of the object block (right-hand side block) are normal blocks (blocks that are not invalid blocks), the left-adjacent pixels L07~L77 and the right-adjacent pixels R00~R70 are used for the estimation. Pixel values in the left-hand half of the object block (pixels C00~C03, C10~C13, C20~C23, C30~C33, C40~C43, C50~53, C60~C63, C70~C73) are replaced with the mean pixel value LM of the left-adjacent pixels L07~L77, and pixel values in the right-hand half of the object block (pixels C04~C07, C14~C17, C24~C27, C34~C37, C44~C47, C54~C57, C64~C67, C74~C77) are replaced with the mean pixel value RM of the right-adjacent pixels R00~R70.

If the left-hand side block or the right-hand side block is an invalid block, the top-adjacent pixels T70~T77 and the bottom-adjacent pixels B00~B07 are used for the estimation. Pixel values in the upper half of the object block (pixels C00~C37) are replaced with the mean pixel value TM of the top-adjacent pixels T70~T77, and pixel values in the lower half of the object block (pixels C40~C77) are replaced with the mean pixel value BM of the bottom-adjacent pixels B00~B07.

In this case, if the top-adjacent block or the bottom-adjacent block is an invalid block, pixels of one of the blocks that is not the invalid block is used for the estimation. Concretely, when the bottom-adjacent block is an invalid block, the pixel values of the object block (pixels C00~C77) are replaced with the mean pixel value TM of the top-adjacent pixels T70~T77. When the top-adjacent block is an invalid block, the pixel values of the object block (pixels C00~C77) are replaced with the mean pixel value BM of the bottom-adjacent pixels B00~B07.

In this case, if both the top-adjacent block and the bottom-adjacent block are invalid blocks, the pixel values of the object block (pixels C00~C77) are replaced with a predetermined pixel value.

Incidentally, while the above explanation for the intra-frame concealment process was given taking an 8×8 block (including 8×8 pixels) as an example, the intra-frame concealment process can also be conducted similarly for blocks of other sizes (16×16 etc.).

As other methods for the intra-frame concealment process, the pixel values of the object block can be estimated by extracting outlines (edges) from the images of adjacent blocks and extending the outlines to the object block. It is also possible to estimate the pixel value distribution of the object block as a linear combination of basis functions based on pixel value distribution of adjacent blocks, as disclosed in P. Salama et al. "A Bayesian approach to error concealment in encoded video streams", ICIP (International Conference of Image Processing) '96 (1996).

On the other hand, in the inter-frame concealment process, pixel values of the object block are estimated by use of pixel values of an appropriate block in the previous frame. The appropriate block in the previous frame can be a block at the same position as the object block, or a block at a position that is determined by motion compensation prediction.

Both the intra-frame concealment process and the inter-frame concealment process explained above can be employed by the first invalid block concealment section 105 and the second invalid block concealment section 108.

Figure 5:
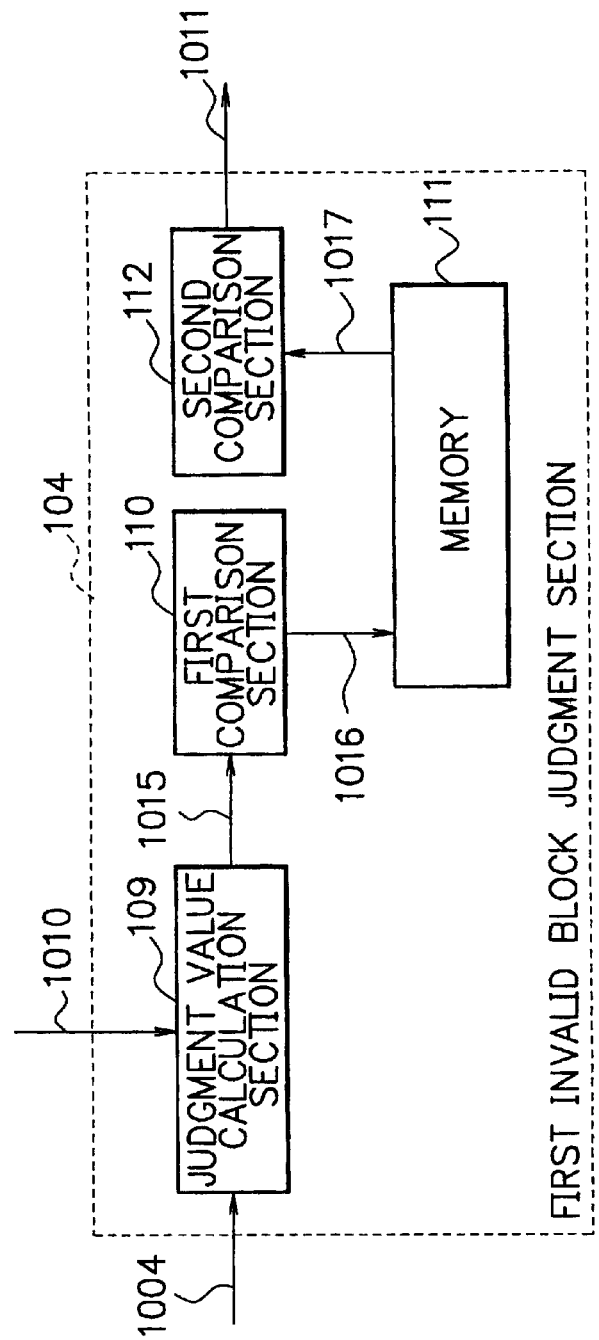
FIG. 5 is a block diagram showing an example of the composition of a first invalid block judgment section of the video decoding device of FIG. 3.

In the following, the operation of the first invalid block judgment section 104 will be explained in detail referring to FIG. 5. FIG. 5 is a block diagram showing an example of the composition of the first invalid block judgment section 104.

The first invalid block judgment section 104 shown in FIG. 5 includes a judgment value calculation section 109, a first comparison section 110, a second comparison section 112 and a memory 111. The judgment value calculation section 109 receives the address signal 1004 from the packet partitioning section 102 and calculates a judgment value to be used for the judgment on whether the block designated by the address signal 1004 is an invalid block or not, by referring to pixel values of the designated block and/or pixel values 1010 of adjacent blocks. The first comparison section 110 compares the judgment value calculated by the judgment value calculation section 109 with a predetermined threshold value and outputs a comparison result signal 1016 to the memory 111. The memory 111 stores a flag indicating the comparison results of the first comparison section 110. The second comparison section 112 compares the flag value of the memory 111 with a predetermined threshold value.

The first invalid block judgment section 104 conducts the invalid block judgment process as described hereafter referring to FIG. 4. Referring to FIG. 4, the judgment value calculation section 109 calculates the absolute values of pixel value differences on the edge of the designated block: |C00–T70|, |C01–T71|, . . . , |C00–L07| as the judgment values, and outputs the judgment values to the first comparison section 110.

The first comparison section 110 compares the judgment values with a threshold value TH1. If the judgment value is larger than the threshold value TH1, the first comparison section 110 judges that the two pixel values on the edge of the designated block are discontinuous and increments the flag which is stored in the memory 111.

When the comparison process for all the judgment values is finished, the second comparison section 112 compares the flag value of the memory 111 with a threshold value TH2. If the flag value is larger than the threshold value TH2, the second comparison section 112 judges that the discontinuity on the edge of the designated block is high, and thus regards the designated block as an invalid block.

The invalid block judgment process can also be executed by other methods. For example, the discontinuity in pixel value variation in a block can be estimated based on the absolute values of the differences of pixel value variations on the edge of the block and the sum of the absolute values (as disclosed in "A study on error detection for video decoding based on the continuity of image signal", PCSJ (Picture Coding Symposium of Japan) '98, P-3.03 (1998)), or based on the discontinuity of a statistical distribution (as disclosed in International Publication No. WO95/03674), or based on the discontinuity of pixel distribution (pixel value distribution) (such as outlines) in the block.

The video decoding device of the first embodiment is designed to reduce the deterioration of the video signal even when the coded video signal 1000 is transferred through a transmission line of low line quality, by detecting the error points of the video signal efficiently.

In order to attain the above objects, the first invalid block judgment section 104 refers to the address signal 1004 (indicating an error area (blocks) corresponding to the packet to which an error occurred) and conducts the invalid block judgment process with regard to the blocks in the error area only. Therefore, the invalid blocks can be found out efficiently, without the need of enormous throughput of the first invalid block judgment section 104.

For instance, when the error occurs on the transmission line with a probability of $\frac{1}{10000}$, the load on the first invalid block judgment section 104 becomes 0.05% of that on the invalid block judgment section 203 of the conventional video decoding device of FIG. 1 (according to an experiment conducted by the present inventor). In the invalid block judgment process, the comparison with the threshold value has to be done with regard to all the pixels on the edge of the blocks. Therefore, by conducting the invalid block judgment process with regard to the error areas (blocks) only, the load on the first invalid block judgment section 104 can be reduced remarkably.

In the conventional video decoding device of FIG. 1 which employing the first error detection method, the invalid block judgment section 203 conducts the invalid block judgment process also with regard to normally decoded blocks, and thus there was a possibility of misjudgment depending on pixel distribution (pixel value distribution) of the original image.

On the other hand, in the video decoding device of the first embodiment, the object of the invalid block judgment process is limited to the blocks to which errors might have occurred (that is, blocks which were contained in the packets in which errors have been detected by the error detection section 101), thereby the possibility of the above misjudgment is reduced to a very low level.

Figure 2:
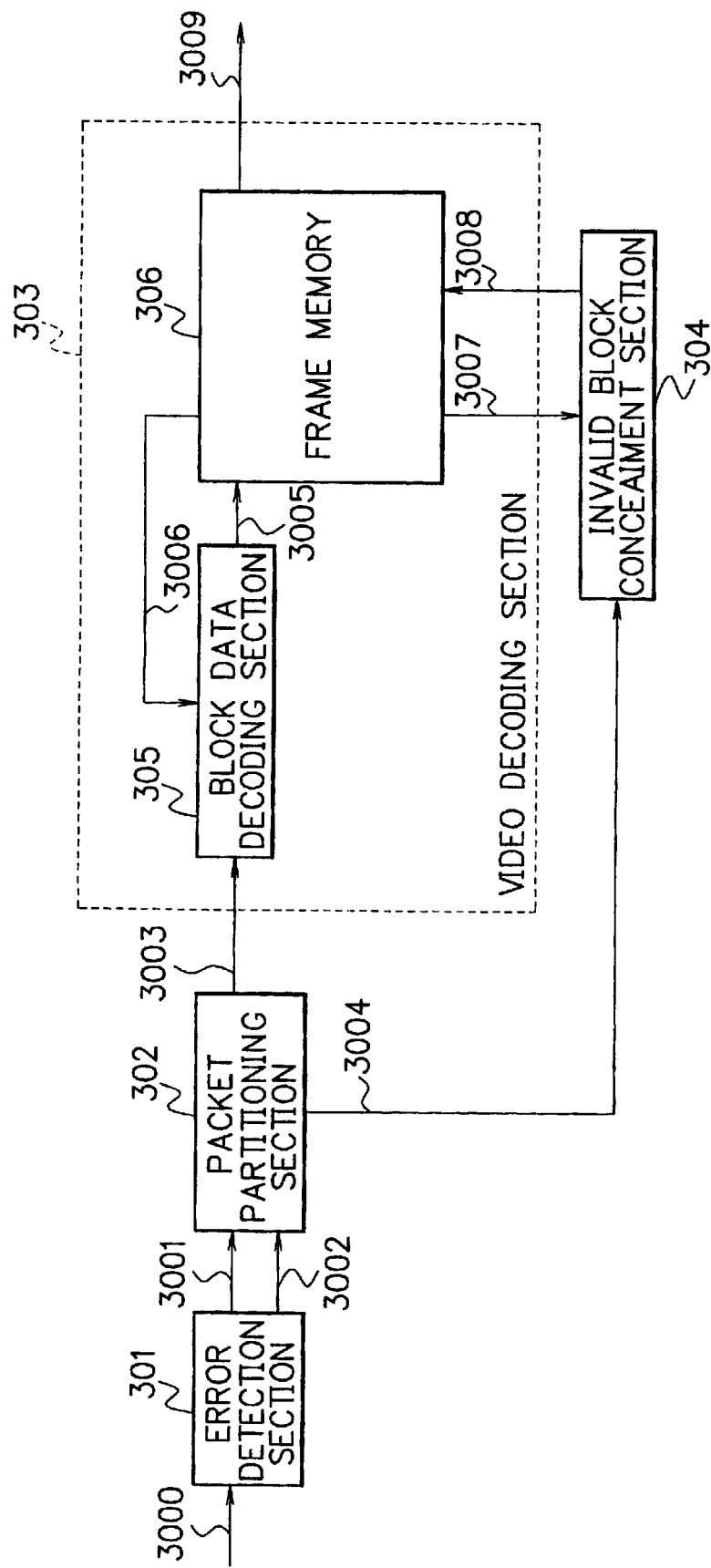
FIG. 2 is a block diagram showing a second conventional video decoding device which executes video decoding employing a second error detection method, in which error detection is conducted by use of error detection code which has been contained in the coded video signal.

In the conventional video decoding device of FIG. 2 in which the invalid block judgment process is conducted by use of the error detection code only, the concealment process is conducted to all the blocks that were contained in the packets in which errors have been detected by the error detection section 301 by use of the error detection code, and thus the possibility of wasteful concealment processes for normal blocks was high. In order to conduct the invalid block judgment process perfectly by use of the error detection code only and to eliminate the wasteful concealment processes, the error detection code has to be provided to every block and thereby the encoding efficiency is necessitated to be decreased much.

On the other hand, in the video decoding device of the first embodiment, the invalid block judgment process is conducted first by the error detection section 101 and thereafter by the block data decoding section 106 and the first invalid block judgment section 104 respectively. Thereafter, the concealment processes are executed by the first invalid block concealment section 105 and the second invalid block concealment section 108 with regard to the blocks in which errors have been detected by the first invalid block judgment section 104 and the block data decoding section 106 respectively. Therefore, the invalid block judgment process can be conducted perfectly and the wasteful concealment processes can be eliminated in the video decoding device of the first embodiment, only by providing the error detection code to each packet which contains a plurality of blocks (coded block data units). Therefore, the video decoding device of the first embodiment, by which the amount of necessary code can be reduced much, is effective especially in environments where the total amount of code is limited.

Figure 6:
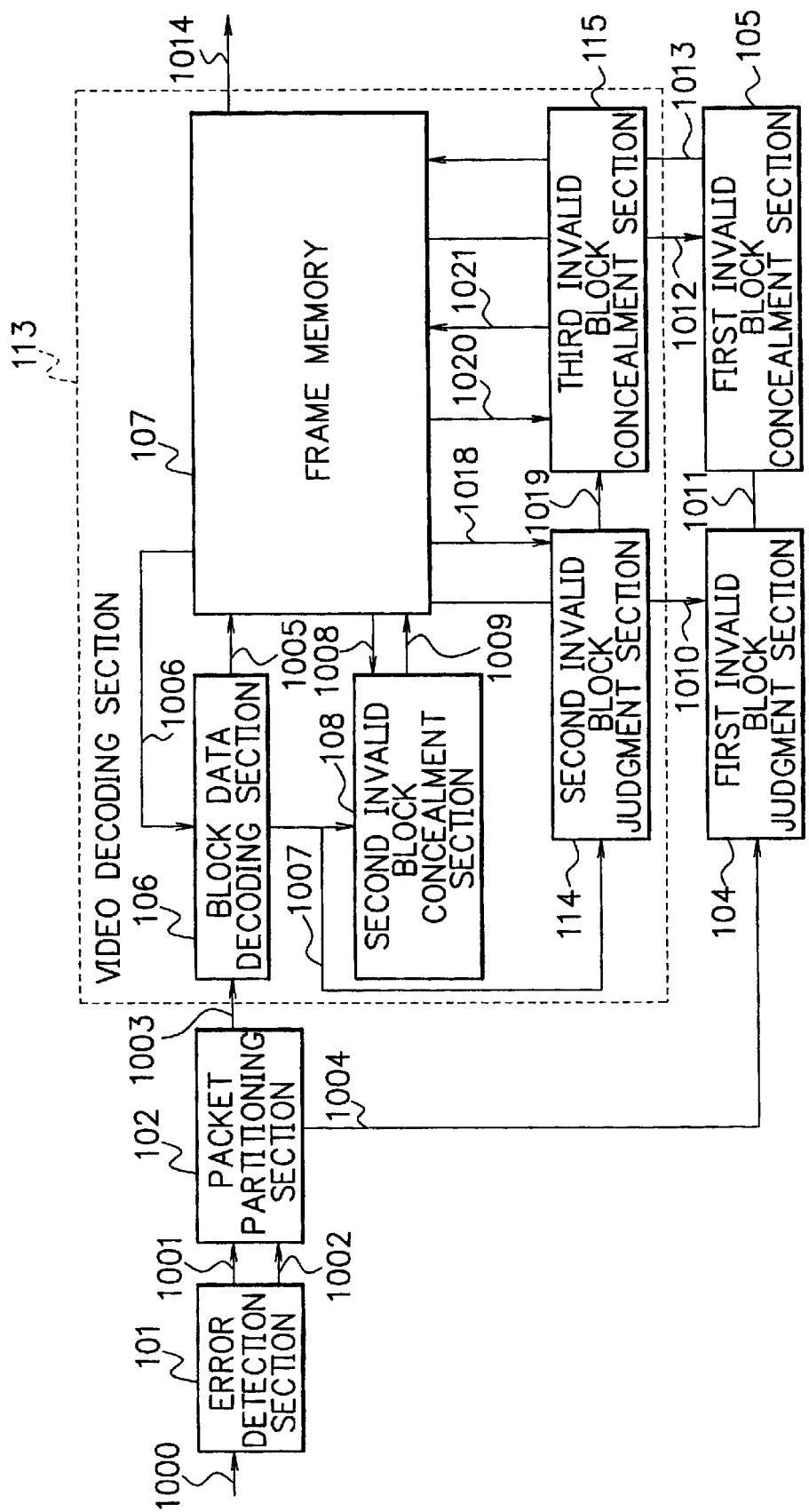
FIG. 6 is a block diagram showing a video decoding device in accordance with a second embodiment of the present invention.

FIG. 6 is a block diagram showing a video decoding device in accordance with a second embodiment of the present invention, in which the same reference characters as those of FIG. 3 designate the same or corresponding parts to those of FIG. 3 and thus repeated description thereof is omitted for brevity.

The video decoding device of the second embodiment (FIG. 6) has an video decoding section 113 which is different from the video decoding section 103 of the video decoding device of the first embodiment (FIG. 3). The video decoding section 113 in the second embodiment further includes a second invalid block judgment section 114 and a third invalid block concealment section 115.

The block data decoding section 106 decodes the coded block data units 1003 supplied from the packet partitioning section 102 by use of previous decoded block data units 1006 (decoded block data units of the previous frame) stored in the frame memory 107 (or without using the previous decoded block data units 1006), and stores the decoded block data units 1005 in the frame memory 107. The block data decoding section 106 outputs the address signal 1007 (indicating addresses of blocks which could not be decoded normally due to errors) to the second invalid block concealment section 108. The second invalid block concealment section 108 conducts the inter-frame concealment process with regard to the invalid blocks which are designated by the address signal 1007, and outputs block data units 1009 obtained by the concealment process.

The second invalid block judgment section 114 refers to pixel values of each block data unit 1009, which has been obtained by the concealment process of the second invalid block concealment section 108 and stored in the frame memory 107, and judges whether or not discontinuity has occurred between the block data unit 1009 and adjacent blocks (invalid block judgment process). The invalid block judgment process of the second invalid block judgment section 114 can be executed in the same way as the invalid block judgment process of the first invalid block judgment section 104, and thus repeated explanation thereof is omitted.

The third invalid block concealment section 115 conducts the intra-frame concealment process with regard to the blocks which have been judged as invalid blocks by the second invalid block judgment section 114, and stores the block data units 1021 obtained by the concealment process in the frame memory 107.

As described above, by the video decoding device in accordance with the second embodiment of the present invention, in addition to the effects of the first embodiment, even when the inter-frame concealment process of the second invalid block concealment section 108 could not be conducted appropriately and thereby discontinuity occurred between the block data unit 1009 obtained by the inter-frame concealment process and adjacent blocks, the block data unit 1009 are modified appropriately by the intra-frame concealment process of the third invalid block concealment section 115, thereby deteriorated blocks (invalid blocks) remaining after the concealment processes can be decreased considerably. In the second embodiment, the inter-frame concealment process, which is generally more effective than the intra-frame concealment process except when motion recorded in the video signal is quick and random, is first conducted by the second invalid block concealment section 108, and thereafter the intra-frame concealment process, which is effective when pixel value variation in the frame is small, is conducted by the third invalid block concealment section 115. Therefore, the concealment process for the invalid blocks can be executed effectively making the most of the characteristics of the concealment methods.

Incidentally, while the second invalid block concealment section 108 and the third invalid block concealment section 115 of the second embodiment employed the inter-frame concealment process and the intra-frame concealment process respectively, it is of course possible to let the second invalid block concealment section 108 and the third invalid block concealment section 115 conduct the intra-frame concealment process and the inter-frame concealment process respectively.

Figure 7:
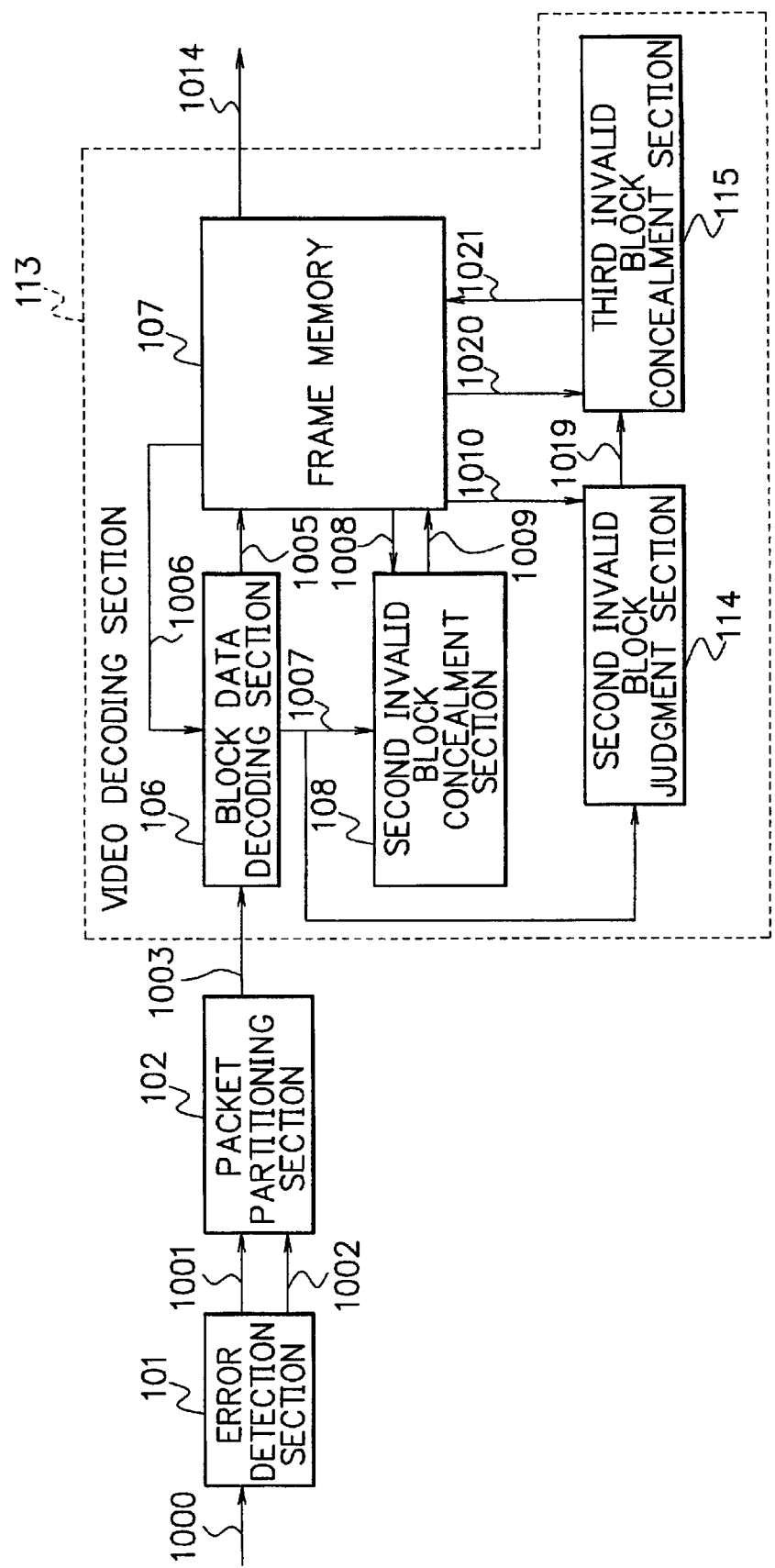
FIG. 7 is a block diagram showing a video decoding device in accordance with a third embodiment of the present invention.

FIG. 7 is a block diagram showing a video decoding device in accordance with a third embodiment of the present invention, in which the same reference characters as those of FIG. 6 designate the same or corresponding parts to those of FIG. 6 and thus repeated description thereof is omitted for brevity.

In the video decoding device of FIG. 7, the first invalid block judgment section 104 and the first invalid block concealment section 105 of the video decoding device of FIG. 6 is omitted.

The video decoding device of FIG. 7 can also reduce the deterioration of the video signal due to errors more effectively in comparison with the conventional video decoding device of FIG. 1. Similarly to the second embodiment, even when discontinuity occurred between the block data unit 1009 obtained by the inter-frame concealment process of the second invalid block concealment section 108 and adjacent blocks, the block data unit 1009 are modified appropriately by the intra-frame concealment process of the third invalid block concealment section 115, thereby deteriorated blocks (invalid blocks) remaining after the concealment processes can be decreased considerably.

As set forth hereinabove, in the video decoding device and the video decoding method in accordance with the present invention, the error detection process (for detecting and determining points (invalid blocks) in the video signal to which errors have occurred) and the concealment process (for correcting pixel values at the error points and thereby concealing the errors) can be conducted effectively and efficiently, thereby the deterioration of the video signal can be eliminated even when errors occurred to the coded video signal due to signal transfer through a transmission line of low line quality etc.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video decoding device for decoding a coded video signal which is supplied to the video decoding device as packets each of which containing a plurality of coded block data units which have been generated by encoding blocks each of which is composed of a predetermined number of pixels of a frame of a video signal, comprising:

an error detection means for judging whether or not an error has occurred to each of the packets and outputting a judgment signal indicating the result of the judgment;

a packet partitioning means for partitioning the packet after the error detection by the error detection means into the coded block data units, while outputting an address signal indicating addresses of blocks that have been contained in the packets to which the errors have occurred;

a video decoding means for successively decoding the coded block data units and outputting a decoded video signal containing block data units obtained by the decoding of the coded block data units;

a first invalid block judgment means for judging whether or not each of the block data units corresponding to the addresses indicated by the address signal from the packet partitioning means is an invalid block which has been decoded abnormally, based on pixel values of adjacent blocks; and a first invalid block concealment means for conducting a concealment process with regard to the block data units that have been judged by the first invalid block judgment means as invalid blocks.

2. A video decoding device as claimed in claim 1, wherein the error detection means conducts the judgment for each packet by use of error detection code which has been contained in the packet.

3. A video decoding device as claimed in claim 1, wherein the first invalid block judgment means includes:

a judgment value calculation means for calculating a judgment value concerning pixel value variation with regard to each pixel in the block designated by the address signal from the packet partitioning means, by referring to pixel values of the designated block and/or pixel values of adjacent blocks;

a first comparison means for successively comparing the judgment value with regard to each pixel calculated by the judgment value calculation means with a first threshold value and successively outputting a comparison result signal with regard to each pixel;

a flag storage means for storing a flag which is incremented depending on the comparison result signal with regard to each pixel; and a second comparison means for comparing the value of the flag with a second threshold value.

4. A video decoding device as claimed in claim 1, wherein the first invalid block concealment means conducts the concealment process by means of an intra-frame concealment process in which pixel values of the block data unit is corrected by use of pixel values of adjacent blocks in the current frame.

5. A video decoding device as claimed in claim 1, wherein the first invalid block concealment means conducts the concealment process by means of an inter-frame concealment process in which pixel values of the block data unit is corrected by use of pixel values of an appropriate block data unit of the previous frame.

6. A video decoding device as claimed in claim 1, wherein the video decoding device is applied to cases where the packets are TCP (Transmission Control Protocol) packets, UDP (User Datagram Protocol) packets or ATM (Asynchronous Transfer Mode) cells.

7. A video decoding device as claimed in claim 1, wherein the video decoding means includes:

a frame memory means for storing the block data units of previously decoded frames and the block data units of a currently decoded frame;

a block data decoding means for successively decoding the coded block data units and outputting the block data units obtained by the decoding of the coded block data units, while outputting an address signal indicating addresses of blocks which could not be decoded normally due to errors contained in the coded block data; and a second invalid block concealment means for conducting a concealment process with regard to the block data units corresponding to the addresses indicated by the address signal from the block data decoding means.

8. A video decoding device as claimed in claim 7, wherein the block data decoding means conducts the decoding of the coded block data units by use of block data units of the previous frame which have been stored in the frame memory means.

9. A video decoding device as claimed in claim 7, wherein the second invalid block concealment means conducts the concealment process by means of an intra-frame concealment process in which pixel values of the block data unit is corrected by use of pixel values of adjacent blocks in the current frame.

10. A video decoding device as claimed in claim 7, wherein the second invalid block concealment means conducts the concealment process by means of an inter-frame concealment process in which pixel values of the block data unit is corrected by use of pixel values of an appropriate block data unit of the previous frame.

11. A video decoding device as claimed in claim 1, wherein the video decoding means includes:
- a frame memory means for storing the block data units of previously decoded frames and the block data units of a currently decoded frame;
- a block data decoding means for successively decoding the coded block data units and outputting the block data units obtained by the decoding of the coded block data units, while outputting an address signal indicating addresses of blocks which could not be decoded normally due to errors contained in the coded block data;
- a second invalid block concealment means for conducting a concealment process with regard to the block data units corresponding to the addresses indicated by the address signal from the block data decoding means;
- a second invalid block judgment means for judging whether or not each block data unit obtained by the concealment process of the second invalid block concealment means is an invalid block whose pixel values are inadequate, based on pixel values of adjacent blocks; and
- a third invalid block concealment means for conducting a concealment process with regard to the block data units which have been judged by the second invalid block judgment means as invalid blocks.

12. A video decoding device as claimed in claim 11, wherein the block data decoding means conducts the decoding of the coded block data units by use of block data units of the previous frame which have been stored in the frame memory means.

13. A video decoding device as claimed in claim 11, wherein the second invalid block judgment means includes:
- a judgment value calculation means for calculating a judgment value concerning pixel value variation with regard to each pixel in the block designated by the address signal from the packet partitioning means, by referring to pixel values of the designated block and/or pixel values of adjacent blocks;
- a first comparison means for successively comparing the judgment value with regard to each pixel calculated by the judgment value calculation means with a first threshold value and successively outputting a comparison result signal with regard to each pixel;
- a flag storage means for storing a flag which is incremented depending on the comparison result signal with regard to each pixel; and
- a second comparison means for comparing the value of the flag with a second threshold value.

14. A video decoding device as claimed in claim 11, wherein:
- the second invalid block concealment means conducts the concealment process by means of an inter-frame concealment process in which pixel values of the block data unit is corrected by use of pixel values of an appropriate block data unit of the previous frame, and
- the third invalid block concealment means conducts the concealment process by means of an intra-frame concealment process in which pixel values of the block data unit is corrected by use of pixel values of adjacent blocks in the current frame.

15. A video decoding device for decoding a coded video signal which is supplied to the video decoding device as packets each of which containing a plurality of coded block data units which have been generated by encoding blocks each of which is composed of a predetermined number of pixels of a frame of a video signal, comprising:
- an error detection means for judging whether or not an error has occurred to each of the packets and outputting a judgment signal indicating the result of the judgment;
- a packet partitioning means for partitioning the packet after the error detection by the error detection means into the coded block data units, while outputting an address signal indicating addresses of blocks that have been contained in the packets to which the errors have occurred; and
- a video decoding means for successively decoding the coded block data units and outputting a decoded video signal containing block data units obtained by the decoding of the coded block data units, which includes:
  - a frame memory means for storing the block data units of previously decoded frames and the block data units of a currently decoded frame;
  - a block data decoding means for successively decoding the coded block data units and outputting the block data units obtained by the decoding of the coded block data units, while outputting an address signal indicating addresses of blocks which could not be decoded normally due to errors contained in the coded block data;
  - a second invalid block concealment means for conducting a concealment process with regard to the block data units corresponding to the addresses indicated by the address signal from the block data decoding means;
  - a second invalid block judgment means for judging whether or not each block data unit obtained by the concealment process of the second invalid block concealment means is an invalid block whose pixel values are inadequate, based on pixel values of adjacent blocks; and
  - a third invalid block concealment means for conducting a concealment process with regard to the block data units which have been judged by the second invalid block judgment means as invalid blocks.

16. A video decoding device as claimed in claim 15, wherein the error detection means conducts the judgment for each packet by use of error detection code which has been contained in the packet.

17. A video decoding device as claimed in claim 15, wherein the block data decoding means conducts the decoding of the coded block data units by use of block data units of the previous frame which have been stored in the frame memory means.

18. A video decoding device as claimed in claim 15, wherein the second invalid block judgment means includes:
   a judgment value calculation means for calculating a judgment value concerning pixel value variation with regard to each pixel in the block designated by the address signal from the packet partitioning means, by referring to pixel values of the designated block and/or pixel values of adjacent blocks;
   a first comparison means for successively comparing the judgment value with regard to each pixel calculated by the judgment value calculation means with a first threshold value and successively outputting a comparison result signal with regard to each pixel;
   a flag storage means for storing a flag which is incremented depending on the comparison result signal with regard to each pixel; and
   a second comparison means for comparing the value of the flag with a second threshold value.

19. A video decoding device as claimed in claim 15, wherein:
   the second invalid block concealment means conducts the concealment process by means of an inter-frame concealment process in which pixel values of the block data unit is corrected by use of pixel values of an appropriate block data unit of the previous frame, and the third invalid block concealment means conducts the concealment process by means of an intra-frame concealment process in which pixel values of the block data unit is corrected by use of pixel values of adjacent blocks in the current frame.

20. A video decoding device as claimed in claim 15, wherein the video decoding device is applied to cases where the packets are TCP (Transmission Control Protocol) packets, UDP (User Datagram Protocol) packets or ATM (Asynchronous Transfer Mode) cells.

21. A video decoding method for decoding a coded video signal which is supplied as packets each of which containing a plurality of coded block data units which have been generated by encoding blocks each of which is composed of a predetermined number of pixels of a frame of a video signal, comprising the steps of:
   an error detection step in which whether or not an error has occurred to each of the packets is judged and a judgment signal indicating the result of the judgment is generated;
   a packet partitioning step in which the packet after the error detection of the error detection step is partitioned into the coded block data units, while an address signal, indicating addresses of blocks that have been contained in the packets to which the errors have occurred, is generated;
   a video decoding step in which the coded block data units are successively decoded in order to generate a decoded video signal containing block data units obtained by the decoding of the coded block data units;
   a first invalid block judgment step in which it is judged whether or not each of the block data units corresponding to the addresses indicated by the address signal generated in the packet partitioning step is an invalid block which has been decoded abnormally, based on pixel values of adjacent blocks; and
   a first invalid block concealment step in which a concealment process is conducted for the block data units that have been judged in the first invalid block judgment step as invalid blocks.

22. A video decoding method as claimed in claim 21, wherein in the error detection step, the judgment for each packet is conducted by use of error detection code which has been contained in the packet.

23. A video decoding method as claimed in claim 21, wherein the first invalid block judgment step includes:
   a judgment value calculation step in which a judgment value concerning pixel value variation is calculated with regard to each pixel in the block designated by the address signal generated in the packet partitioning step, by referring to pixel values of the designated block and/or pixel values of adjacent blocks;
   a first comparison step in which the judgment value with regard to each pixel calculated in the judgment value calculation step is successively compared with a first threshold value and a comparison result signal with regard to each pixel is successively generated;
   a flag increment step in which a flag which is stored in a flag storage means is successively incremented depending on the comparison result signal with regard to each pixel; and
   a second comparison step in which the value of the flag is compared with a second threshold value.

24. A video decoding method as claimed in claim 21, wherein in the first invalid block concealment step, the concealment process is conducted by means of an intra-frame concealment process in which pixel values of the block data unit is corrected by use of pixel values of adjacent blocks in the current frame.

25. A video decoding method as claimed in claim 21, wherein in the first invalid block concealment step, the concealment process is conducted by means of an inter-frame concealment process in which pixel values of the block data unit is corrected by use of pixel values of an appropriate block data unit of the previous frame.

26. A video decoding method as claimed in claim 21, wherein the video decoding method is applied to cases where the packets are TCP (Transmission Control Protocol) packets, UDP (User Datagram Protocol) packets or ATM (Asynchronous Transfer Mode) cells.

27. A video decoding method as claimed in claim 21, wherein the video decoding step includes:
   a frame memory storage step in which the block data units of previously decoded frames and the block data units of a currently decoded frame are stored in a frame memory means;
   a block data decoding step in which the coded block data units are successively decoded and thereby the block data units as the result of the decoding are obtained, while an address signal, indicating addresses of blocks which could not be decoded normally due to errors contained in the coded block data, is generated; and
   a second invalid block concealment step in which a concealment process is conducted for the block data units corresponding to the addresses indicated by the address signal generated in the block data decoding step.

28. A video decoding method as claimed in claim 27, wherein in the block data decoding step, the decoding of the coded block data units is conducted by use of block data units of the previous frame which have been stored in the frame memory means.

29. A video decoding method as claimed in claim 27, wherein in the second invalid block concealment step, the concealment process is conducted by means of an intra-frame concealment process in which pixel values of the block data unit is corrected by use of pixel values of adjacent blocks in the current frame.

30. A video decoding method as claimed in claim 27, wherein in the second invalid block concealment step, the concealment process is conducted by means of an inter-frame concealment process in which pixel values of the block data unit is corrected by use of pixel values of an appropriate block data unit of the previous frame.

31. A video decoding method as claimed in claim 21, wherein the video decoding step includes:
 a frame memory storage step in which the block data units of previously decoded frames and the block data units of a currently decoded frame are stored in a frame memory means;
 a block data decoding step in which the coded block data units are successively decoded and thereby the block data units as the result of the decoding are obtained, while an address signal, indicating addresses of blocks which could not be decoded normally due to errors contained in the coded block data, is generated;
 a second invalid block concealment step in which a concealment process is conducted for the block data units corresponding to the addresses indicated by the address signal generated in the block data decoding step;
 a second invalid block judgment step in which it is judged whether or not each block data unit obtained by the concealment process in the second invalid block concealment step is an invalid block whose pixel values are inadequate, based on pixel values of adjacent blocks; and
 a third invalid block concealment step in which a concealment process is conducted for the block data units which have been judged in the second invalid block judgment step as invalid blocks.

32. A video decoding method as claimed in claim 31, wherein in the block data decoding step, the decoding of the coded block data units is conducted by use of block data units of the previous frame which have been stored in the frame memory means.

33. A video decoding method as claimed in claim 31, wherein the second invalid block judgment step includes:
 a judgment value calculation step in which a judgment value concerning pixel value variation is calculated with regard to each pixel in the block designated by the address signal generated in the packet partitioning step, by referring to pixel values of the designated block and/or pixel values of adjacent blocks;
 a first comparison step in which the judgment value with regard to each pixel calculated in the judgment value calculation step is successively compared with a first threshold value and a comparison result signal with regard to each pixel is successively generated;
 a flag increment step in which a flag which is stored in a flag storage means is successively incremented depending on the comparison result signal with regard to each pixel; and
 a second comparison step in which the value of the flag is compared with a second threshold value.

34. A video decoding method as claimed in claim 31, wherein:
 the concealment process in the second invalid block concealment step is conducted by means of an inter-frame concealment process in which pixel values of the block data unit is corrected by use of pixel values of an appropriate block data unit of the previous frame, and
 the concealment process in the third invalid block concealment step is conducted by means of an intra-frame concealment process in which pixel values of the block data unit is corrected by use of pixel values of adjacent blocks in the current frame.

35. A video decoding method for decoding a coded video signal which is supplied as packets each of which containing a plurality of coded block data units which have been generated by encoding blocks each of which is composed of a predetermined number of pixels of a frame of a video signal, comprising the steps of:
 an error detection step in which whether or not an error has occurred to each of the packets is judged and a judgment signal indicating the result of the judgment is generated;
 a packet partitioning step in which the packet after the error detection of the error detection step is partitioned into the coded block data units, while an address signal, indicating addresses of blocks that have been contained in the packets to which the errors have occurred, is generated; and
 a video decoding step in which the coded block data units are successively decoded in order to generate a decoded video signal containing block data units obtained by the decoding of the coded block data units, which includes:
  a frame memory storage step in which the block data units of previously decoded frames and the block data units of a currently decoded frame are stored in a frame memory means;
  a block data decoding step in which the coded block data units are successively decoded and thereby the block data units as the result of the decoding are obtained, while an address signal, indicating addresses of blocks which could not be decoded normally due to errors contained in the coded block data, is generated;
  a second invalid block concealment step in which a concealment process is conducted for the block data units corresponding to the addresses indicated by the address signal generated in the block data decoding step;
  a second invalid block judgment step in which it is judged whether or not each block data unit obtained by the concealment process in the second invalid block concealment step is an invalid block whose pixel values are inadequate, based on pixel values of adjacent blocks; and
  a third invalid block concealment step in which a concealment process is conducted for the block data units which have been judged in the second invalid block judgment step as invalid blocks.

36. A video decoding method as claimed in claim 35, wherein in the error detection step, the judgment for each packet is conducted by use of error detection code which has been contained in the packet.

37. A video decoding method as claimed in claim 35, wherein in the block data decoding step, the decoding of the coded block data units is conducted by use of block data units of the previous frame which have been stored in the frame memory means.

38. A video decoding method as claimed in claim 35, wherein the second invalid block judgment step includes:
- a judgment value calculation step in which a judgment value concerning pixel value variation is calculated with regard to each pixel in the block designated by the address signal generated in the packet partitioning step, by referring to pixel values of the designated block and/or pixel values of adjacent blocks;
- a first comparison step in which the judgment value with regard to each pixel calculated in the judgment value calculation step is successively compared with a first threshold value and a comparison result signal with regard to each pixel is successively generated;
- a flag increment step in which a flag which is stored in a flag storage means is successively incremented depending on the comparison result signal with regard to each pixel; and
- a second comparison step in which the value of the flag is compared with a second threshold value.

39. A video decoding method as claimed in claim 35, wherein:
- the concealment process in the second invalid block concealment step is conducted by means of an interframe concealment process in which pixel values of the block data unit is corrected by use of pixel values of an appropriate block data unit of the previous frame, and
- the concealment process in the third invalid block concealment step is conducted by means of an intra-frame concealment process in which pixel values of the block data unit is corrected by use of pixel values of adjacent blocks in the current frame.

40. A video decoding method as claimed in claim 35, wherein the video decoding method is applied to cases where the packets are TCP (Transmission Control Protocol) packets, UDP (User Datagram Protocol) packets or ATM (Asynchronous Transfer Mode) cells.

41. A machine-readable record medium storing a program for instructing an MPU (MicroProcessor Unit) etc. to execute a video decoding process for decoding a coded video signal which is supplied as packets each of which containing a plurality of coded block data units which have been generated by encoding blocks each of which is composed of a predetermined number of pixels of a frame of a video signal, wherein the video decoding process comprises the steps of:
- an error detection step in which whether or not an error has occurred to each of the packets is judged and a judgment signal indicating the result of the judgment is generated;
- a packet partitioning step in which the packet after the error detection of the error detection step is partitioned into the coded block data units, while an address signal, indicating addresses of blocks that have been contained in the packets to which the errors have occurred, is generated;
- a video decoding step in which the coded block data units are successively decoded in order to generate a decoded video signal containing block data units obtained by the decoding of the coded block data units;
- a first invalid block judgment step in which it is judged whether or not each of the block data units corresponding to the addresses indicated by the address signal generated in the packet partitioning step is an invalid block which has been decoded abnormally, based on pixel values of adjacent blocks; and
- a first invalid block concealment step in which a concealment process is conducted for the block data units that have been judged in the first invalid block judgment step as invalid blocks.

42. A machine-readable record medium as claimed in claim 41, wherein in the error detection step, the judgment for each packet is conducted by use of error detection code which has been contained in the packet.

43. A machine-readable record medium as claimed in claim 41, wherein the first invalid block judgment step includes:
- a judgment value calculation step in which a judgment value concerning pixel value variation is calculated with regard to each pixel in the block designated by the address signal generated in the packet partitioning step, by referring to pixel values of the designated block and/or pixel values of adjacent blocks;
- a first comparison step in which the judgment value with regard to each pixel calculated in the judgment value calculation step is successively compared with a first threshold value and a comparison result signal with regard to each pixel is successively generated;
- a flag increment step in which a flag which is stored in a flag storage means is successively incremented depending on the comparison result signal with regard to each pixel; and
- a second comparison step in which the value of the flag is compared with a second threshold value.

44. A machine-readable record medium as claimed in claim 41, wherein in the first invalid block concealment step, the concealment process is conducted by means of an intra-frame concealment process in which pixel values of the block data unit is corrected by use of pixel values of adjacent blocks in the current frame.

45. A machine-readable record medium as claimed in claim 41, wherein in the first invalid block concealment step, the concealment process is conducted by means of an inter-frame concealment process in which pixel values of the block data unit is corrected by use of pixel values of an appropriate block data unit of the previous frame.

46. A machine-readable record medium as claimed in claim 41, wherein the video decoding process is applied to cases where the packets are TCP (Transmission Control Protocol) packets, UDP (User Datagram Protocol) packets or ATM (Asynchronous Transfer Mode) cells.

47. A machine-readable record medium as claimed in claim 41, wherein the video decoding step includes:
- a frame memory storage step in which the block data units of previously decoded frames and the block data units of a currently decoded frame are stored in a frame memory means;
- a block data decoding step in which the coded block data units are successively decoded and thereby the block data units as the result of the decoding are obtained, while an address signal, indicating addresses of blocks which could not be decoded normally due to errors contained in the coded block data, is generated; and
- a second invalid block concealment step in which a concealment process is conducted for the block data units corresponding to the addresses indicated by the address signal generated in the block data decoding step.

48. A machine-readable record medium as claimed in claim 47, wherein in the block data decoding step, the decoding of the coded block data units is conducted by use of block data units of the previous frame which have been stored in the frame memory means.

49. A machine-readable record medium as claimed in claim 47, wherein in the second invalid block concealment step, the concealment process is conducted by means of an intra-frame concealment process in which pixel values of the block data unit is corrected by use of pixel values of adjacent blocks in the current frame.

50. A machine-readable record medium as claimed in claim 47, wherein in the second invalid block concealment step, the concealment process is conducted by means of an inter-frame concealment process in which pixel values of the block data unit is corrected by use of pixel values of an appropriate block data unit of the previous frame.

51. A machine-readable record medium as claimed in claim 41, wherein the video decoding step includes:
 a frame memory storage step in which the block data units of previously decoded frames and the block data units of a currently decoded frame are stored in a frame memory means;
 a block data decoding step in which the coded block data units are successively decoded and thereby the block data units as the result of the decoding are obtained, while an address signal, indicating addresses of blocks which could not be decoded normally due to errors contained in the coded block data, is generated;
 a second invalid block concealment step in which a concealment process is conducted for the block data units corresponding to the addresses indicated by the address signal generated in the block data decoding step;
 a second invalid block judgment step in which it is judged whether or not each block data unit obtained by the concealment process in the second invalid block concealment step is an invalid block whose pixel values are inadequate, based on pixel values of adjacent blocks; and
 a third invalid block concealment step in which a concealment process is conducted for the block data units which have been judged in the second invalid block judgment step as invalid blocks.

52. A machine-readable record medium as claimed in claim 51, wherein in the block data decoding step, the decoding of the coded block data units is conducted by use of block data units of the previous frame which have been stored in the frame memory means.

53. A machine-readable record medium as claimed in claim 51, wherein the second invalid block judgment step includes:
 a judgment value calculation step in which a judgment value concerning pixel value variation is calculated with regard to each pixel in the block designated by the address signal generated in the packet partitioning step, by referring to pixel values of the designated block and/or pixel values of adjacent blocks;
 a first comparison step in which the judgment value with regard to each pixel calculated in the judgment value calculation step is successively compared with a first threshold value and a comparison result signal with regard to each pixel is successively generated;
 a flag increment step in which a flag which is stored in a flag storage means is successively incremented depending on the comparison result signal with regard to each pixel; and
 a second comparison step in which the value of the flag is compared with a second threshold value.

54. A machine-readable record medium as claimed in claim 51, wherein:
 the concealment process in the second invalid block concealment step is conducted by means of an inter-frame concealment process in which pixel values of the block data unit is corrected by use of pixel values of an appropriate block data unit of the previous frame, and
 the concealment process in the third invalid block concealment step is conducted by means of an intra-frame concealment process in which pixel values of the block data unit is corrected by use of pixel values of adjacent blocks in the current frame.

55. A machine-readable record medium for decoding a coded video signal which is supplied as packets each of which containing a plurality of coded block data units which have been generated by encoding blocks each of which is composed of a predetermined number of pixels of a frame of a video signal, comprising the steps of:
 an error detection step in which whether or not an error has occurred to each of the packets is judged and a judgment signal indicating the result of the judgment is generated;
 a packet partitioning step in which the packet after the error detection of the error detection step is partitioned into the coded block data units, while an address signal, indicating addresses of blocks that have been contained in the packets to which the errors have occurred, is generated; and
 a video decoding step in which the coded block data units are successively decoded in order to generate a decoded video signal containing block data units obtained by the decoding of the coded block data units, which includes:
  a frame memory storage step in which the block data units of previously decoded frames and the block data units of a currently decoded frame are stored in a frame memory means;
  a block data decoding step in which the coded block data units are successively decoded and thereby the block data units as the result of the decoding are obtained, while an address signal, indicating addresses of blocks which could not be decoded normally due to errors contained in the coded block data, is generated;
  a second invalid block concealment step in which a concealment process is conducted for the block data units corresponding to the addresses indicated by the address signal generated in the block data decoding step;
  a second invalid block judgment step in which it is judged whether or not each block data unit obtained by the concealment process in the second invalid block concealment step is an invalid block whose pixel values are inadequate, based on pixel values of adjacent blocks; and
  a third invalid block concealment step in which a concealment process is conducted for the block data units which have been judged in the second invalid block judgment step as invalid blocks.

56. A machine-readable record medium as claimed in claim 55, wherein in the error detection step, the judgment for each packet is conducted by use of error detection code which has been contained in the packet.

57. A machine-readable record medium as claimed in claim 55, wherein in the block data decoding step, the decoding of the coded block data units is conducted by use of block data units of the previous frame which have been stored in the frame memory means.

58. A machine-readable record medium as claimed in claim 55, wherein the second invalid block judgment step includes:

a judgment value calculation step in which a judgment value concerning pixel value variation is calculated with regard to each pixel in the block designated by the address signal generated in the packet partitioning step, by referring to pixel values of the designated block and/or pixel values of adjacent blocks;

a first comparison step in which the judgment value with regard to each pixel calculated in the judgment value calculation step is successively compared with a first threshold value and a comparison result signal with regard to each pixel is successively generated;

a flag increment step in which a flag which is stored in a flag storage means is successively incremented depending on the comparison result signal with regard to each pixel; and a second comparison step in which the value of the flag is compared with a second threshold value.

59. A machine-readable record medium as claimed in claim 55, wherein:

the concealment process in the second invalid block concealment step is conducted by means of an interframe concealment process in which pixel values of the block data unit is corrected by use of pixel values of an appropriate block data unit of the previous frame, and the concealment process in the third invalid block concealment step is conducted by means of an intra-frame concealment process in which pixel values of the block data unit is corrected by use of pixel values of adjacent blocks in the current frame.

60. A machine-readable record medium as claimed in claim 55, wherein the video decoding process is applied to cases where the packets are TCP (Transmission Control Protocol) packets, UDP (User Datagram Protocol) packets or ATM (Asynchronous Transfer Mode) cells.

61. A video decoding apparatus comprising:

receiving means for receiving an input signal;

determining means for generating a coded signal from said input signal, for determining an error portion in said coded signal, which is comprised of a plurality of coded block data units, for determining error coded block data units as ones of coded data blocks that include said error portion in said coded signal, and for outputting address signals indicative of said error coded block data units;

decoding means for decoding each of said plurality of coded block data units of said coded signal to generate decoded block data;

storing means for storing said decoded block data;

judging means for receiving said address signals indicative of said error coded block data units, for receiving said decoded block data output from said storing means corresponding to said error coded block data units, and for judging whether each of said error coded block data units is an invalid block; and error concealing means for error concealing decoded error coded block data units judged by said judging means as being invalid blocks.

62. A video decoding method comprising:

receiving an input signal;

generating a coded signal from said input signal, determining an error portion in said coded signal, which is comprised of a plurality of coded block data units, determining error coded block data units as one of coded data blocks that include said error portion in said coded signal, and outputting address signals indicative of said error coded block data units;

decoding each of said plurality of coded block data units of said coded signal to generate decoded block data;

storing said decoded block data in a frame memory;

receiving said address signals indicative of said error coded block dta units, receiving said decoded block data output from said frame memory corresponding to said error coded block data units, and judging whether each of said error coded block data units is an invalid block; and error concealing decoded error coded block data units judged by said judging step as being invalid blocks.

63. A machine-readable record medium storing a program for instructing an MPU (MicroProcessor Unit) to execute a video decoding process for decoding a coded video signal, the video decoding process comprising:

receiving an input signal;

generating a coded signal from said input signal, determining an error portion in said coded signal, which is comprised of a plurality of coded block data units, determining error coded block data units as ones of coded data blocks that include said error portion in said coded signal, and outputting address signals indicative of said error coded block data units;

decoding each of said plurality of coded block data units of said coded signal to generate decoded block data;

storing said decoded block data in a frame memory;

receiving said address signals indicative of said error coded block data units, receiving said decoded block data output from said frame memory corresponding to said error coded block data units, and judging whether each of said error coded block data units is an invalid block; and error concealing decoded error coded block data units judged by said judging step as being invalid blocks.

* * * * *